United States Patent
Yuan

(10) Patent No.: US 9,781,591 B2
(45) Date of Patent: Oct. 3, 2017

(54) METHOD, APPARATUS AND MOBILE DEVICE FOR MEASURING INTERNET TRAFFIC OF MOBILE DEVICE

(71) Applicants: Huawei Device Co., Ltd., Shenzhen (CN); Yajun Zhang, Beijing (CN)

(72) Inventor: Zhiquan Yuan, Shenzhen (CN)

(73) Assignee: HUAWEI DEVICE CO., LTD., Shenzhen (CN)

( * ) Notice: Subject to any disclaimer, the term of this patent is extended or adjusted under 35 U.S.C. 154(b) by 0 days.

(21) Appl. No.: 14/961,530

(22) Filed: Dec. 7, 2015

(65) Prior Publication Data
US 2016/0088466 A1 Mar. 24, 2016

Related U.S. Application Data

(63) Continuation of application No. 14/323,466, filed on Jul. 3, 2014, now Pat. No. 9,467,846, which is a (Continued)

(30) Foreign Application Priority Data

Jan. 12, 2010 (CN) .......................... 2010 1 0000578

(51) Int. Cl.
*H04W 8/18* (2009.01)
*H04L 12/14* (2006.01)
(Continued)

(52) U.S. Cl.
CPC ........... *H04W 8/183* (2013.01); *H04L 12/141* (2013.01); *H04L 12/1464* (2013.01);
(Continued)

(58) Field of Classification Search
CPC ......... H04W 8/183; H04W 4/26; H04W 4/24; H04M 15/8214; H04M 15/852;
(Continued)

(56) References Cited

U.S. PATENT DOCUMENTS 7,421,287 B2   9/2008 Cho et al.
8,725,110 B2   5/2014 Xiong et al.
(Continued)

FOREIGN PATENT DOCUMENTS

CN    1411314 A    4/2003
CN    1464732 A    12/2003
(Continued)

OTHER PUBLICATIONS

Foreign Communication From a Counterpart Application, European Application No. 15179360.1, Extended European Search Report dated Dec. 9, 2015, 13 pages.
(Continued)

*Primary Examiner* — Marcos Torres
(74) *Attorney, Agent, or Firm* — Conley Rose, P.C.

(57) ABSTRACT

An apparatus for measuring and displaying Internet traffic of a mobile device, which includes a traffic measurement module and a traffic display module. The apparatus also includes a SIM card account creation module configured to create a SIM card account for each of a plurality of SIM cards. The traffic measurement module measures the Internet traffic of each of the SIM card accounts. The traffic display module displays the Internet traffic of each of the SIM card accounts. The Internet traffic of each SIM card on the mobile device may be measured and displayed.

22 Claims, 3 Drawing Sheets

Related U.S. Application Data continuation of application No. 13/457,214, filed on Apr. 26, 2012, now Pat. No. 8,805,322, which is a continuation of application No. PCT/CN2010/079980, filed on Dec. 20, 2010.

(51) Int. Cl.

| | | |
|---|---|---|
| H04M 15/28 | (2006.01) | |
| H04M 15/30 | (2006.01) | |
| H04M 15/00 | (2006.01) | |
| H04W 4/24 | (2009.01) | |
| H04W 4/26 | (2009.01) | |

(52) U.S. Cl.
CPC ........... *H04M 15/28* (2013.01); *H04M 15/30* (2013.01); *H04M 15/77* (2013.01); *H04M 15/774* (2013.01); *H04M 15/8214* (2013.01); *H04M 15/83* (2013.01); *H04M 15/835* (2013.01); *H04M 15/8355* (2013.01); *H04M 15/84* (2013.01); *H04M 15/844* (2013.01); *H04M 15/85* (2013.01); *H04M 15/852* (2013.01); *H04M 15/857* (2013.01); *H04W 4/24* (2013.01); *H04W 4/26* (2013.01); *H04L 12/1435* (2013.01); *H04L 12/1439* (2013.01)

(58) Field of Classification Search
CPC ...... H04M 15/85; H04M 15/84; H04M 15/28; H04M 15/30; H04M 15/774; H04M 15/83; H04M 15/77; H04M 15/8355; H04M 15/844; H04M 15/835; H04M 15/857; H04L 12/141; H04L 12/1464; H04L 12/1439; H04L 12/1435
See application file for complete search history.

(56) References Cited

U.S. PATENT DOCUMENTS

| | | | |
|---|---|---|---|
| 2002/0091599 A1 | 7/2002 | Masuda et al. | |
| 2005/0096087 A1* | 5/2005 | Kim | 455/558 |
| 2005/0164737 A1* | 7/2005 | Brown | 455/558 |
| 2005/0176465 A1* | 8/2005 | Fornell | 455/558 |
| 2005/0250537 A1* | 11/2005 | Narea | H04M 15/765 455/558 |
| 2007/0117551 A1* | 5/2007 | Boris | H04M 15/30 455/414.1 |
| 2007/0184858 A1* | 8/2007 | Landschaft et al. | 455/466 |
| 2008/0045179 A1 | 2/2008 | Bekanich et al. | |
| 2008/0261603 A1 | 10/2008 | Sever et al. | |
| 2010/0048169 A1 | 2/2010 | Yan et al. | |
| 2010/0090000 A1* | 4/2010 | Varone et al. | 235/382 |
| 2010/0159874 A1* | 6/2010 | Lewis et al. | 455/406 |
| 2010/0248690 A1* | 9/2010 | Biggs et al. | 455/411 |
| 2012/0082059 A1 | 4/2012 | Wang et al. | |
| 2012/0158947 A1* | 6/2012 | Hassan et al. | 709/224 |
| 2012/0214439 A1 | 8/2012 | Yuan et al. | |
| 2013/0102276 A1 | 4/2013 | Raj et al. | |
| 2013/0149994 A1 | 6/2013 | Gaddam et al. | |
| 2013/0210382 A1 | 8/2013 | Korkiakoski et al. | |
| 2014/0315515 A1 | 10/2014 | Yuan | |
| 2014/0323084 A1 | 10/2014 | Menezes et al. | |

FOREIGN PATENT DOCUMENTS

| | | |
|---|---|---|
| CN | 1885889 A | 12/2006 |
| CN | 101146300 A | 3/2008 |
| CN | 101183950 A | 5/2008 |
| CN | 101459523 A | 6/2009 |
| CN | 101600186 A | 12/2009 |
| CN | 101800792 A | 8/2010 |
| CN | 102045434 A | 5/2011 |
| JP | 2002209030 A | 7/2002 |
| JP | 2005184538 A | 7/2005 |
| JP | 2007221274 A | 8/2007 |
| WO | 9219078 A1 | 10/1992 |
| WO | 2011085626 A1 | 7/2011 |

OTHER PUBLICATIONS

Foreign Communication From a Counterpart Application, European Application No. 10842908.5, European Notice of Allowance dated Jun. 1, 2015, 7 pages.
Foreign Communication From a Counterpart Application, European Application No. 10842908.5, Extended European Search Report dated Sep. 12, 2012, 8 pages.
Foreign Communication From a Counterpart Application, Japanese Application No. 2012-530120, English Translation of Japanese Office Action dated Jul. 2, 2013, 2 pages.
Partial English Translation and Abstract of Japanese Patent Application No. JP2002209030, Mar. 24, 2016, 47 pages.
Partial English Translation and Abstract of Japanese Patent Application No. JP2005184538, Mar. 28, 2016, 14 pages.
Partial English Translation and Abstract of Japanese Patent Application No. JP2007221274, Mar. 24, 2016, 21 pages.
Partial English Translation and Abstract of Chinese Patent Application No. CN001464732, Dec. 8, 2015, 3 pages.
Partial English Translation and Abstract of Chinese Patent Application No. CN001885889, Dec. 8, 2015, 3 pages.
Partial English Translation and Abstract of Chinese Patent Application No. CN101459523, Dec. 8, 2015, 3 pages.
Partial English Translation and Abstract of Chinese Patent Application No. CN101183950, Part 1, Dec. 8, 2015, 5 pages.
Partial English Translation and Abstract of Chinese Patent Application No. CN101183950, Part 2, Dec. 8, 2015, 3 pages.
Partial English Translation and Abstract of Chinese Patent Application No. CN102045434, Mar. 15, 2016, 13 pages.
Office Action dated Apr. 8, 2015, 9 pages, U.S. Appl. No. 14/323,466, filed Jul. 3, 2014.
Office Action dated May 10, 2013, 16 pages, U.S. Appl. No. 13/457,214, filed Apr. 26, 2012.
Office Action dated Nov. 21, 2012, 14 pages, U.S. Appl. No. 13/457,214, filed Apr. 26, 2012.
Foreign Communication From a Counterpart Application, PCT Application No. PCT/CN2010/079980, English Translation of International Search Report dated Mar. 31, 2011, 4 pages.
Foreign Communication From a Counterpart Application, PCT Application No. PCT/CN2010/079980, English Translation of Written Opinion dated Mar. 31, 2011, 5 pages.
Partial English Translation and Abstract of Chinese Patent Application No. CN101146300, Mar. 19, 2008, 5 pages.
Partial English Translation and Abstract of Chinese Patent Application No. CN101183950, May 21, 2008, 4 pages.
Foreign Communication From a Counterpart Application, Chinese Application No. 201610135652.5, Chinese Search Report dated Jul. 15, 2016, 8 pages.

\* cited by examiner

METHOD, APPARATUS AND MOBILE DEVICE FOR MEASURING INTERNET TRAFFIC OF MOBILE DEVICE

CROSS-REFERENCE TO RELATED APPLICATIONS

This application is a continuation of U.S. patent application Ser. No. 14/323,466, filed on Jul. 3, 2014, which is a continuation of U.S. patent application Ser. No. 13/457,214, filed on Apr. 26, 2012, now U.S. Pat. No. 8,805,322, which is a continuation of International Application No. PCT/CN2010/079980, filed on Dec. 20, 2010, which claims priority to Chinese Patent Application No. 201010000578.9, filed on Jan. 12, 2010. The afore-mentioned applications are incorporated herein by reference in their entireties.

FIELD OF THE APPLICATION

The present application relates to the field of mobile phone terminal technologies, and in particular, to a method, an apparatus, and a mobile phone for measuring and displaying Internet traffic of a mobile phone.

BACKGROUND OF THE APPLICATION

With the development of third generation (3G) technologies, it is increasingly popular to surf the Internet by using a mobile phone. A user hopes to query Internet traffic. For example, the user subscribes to a monthly Internet-surfing package service and may enjoy a total of 1000 megabit (MB) Internet traffic. A charge for excess of the traffic is high. Therefore, the user hopes to know current Internet traffic to control subsequent Internet traffic so as to save an expense. Currently, the user may query the Internet traffic by logging in to a Web site of an operator such as China Mobile or China Unicom and entering keywords such as a mobile phone number and personal information, or dial a customer service number or send a short message to know the Internet traffic. However, these methods are all cumbersome, and in order to simplify the operational process of the user, some mobile phones integrate a function of querying the Internet traffic. Specifically, an Internet traffic measuring module is disposed in a mobile phone, and the module implements a function of Internet traffic measurement by counting the Internet traffic. The user does not need to perform querying to the operator, and may view a using condition of the Internet traffic simply by using the user's own mobile phone, which is very convenient. However, during the research, the inventor discovers that the Internet traffic measurement function on a mobile phone performs the measurement only for the mobile phone at present, but currently more and more users use two or more subscriber identification module (SIM) cards on one mobile phone, for example, one SIM card is used in office hours, and another SIM card is used at home, or for a dual-mode or multimode mobile phone, multiple SIM cards may be supported simultaneously. In this case, the original Internet traffic measurement based on the mobile phone cannot meet a requirement.

SUMMARY OF THE APPLICATION

The described embodiments provide a method, an apparatus, and a mobile phone for measuring and displaying Internet traffic of a mobile phone so that the Internet traffic of the mobile phone can be measured and displayed based on SIM cards respectively.

For the foregoing purpose, the embodiments adopt the following technical solutions:

An apparatus for measuring and displaying Internet traffic of a mobile phone includes a traffic measuring module, a traffic displaying module, and a SIM card account creating module, where the SIM card account creating module is configured to create a SIM card account for each SIM card respectively; the traffic measuring module is configured to measure Internet traffic of each SIM card account respectively; and the traffic displaying module is configured to display the Internet traffic of each SIM card account respectively.

A mobile phone for measuring and displaying Internet traffic according to SIM cards includes a traffic measuring module, a traffic displaying module, and a SIM card account creating module, where the SIM card account creating module is configured to create a SIM card account for each SIM card respectively; the traffic measuring module is configured to measure Internet traffic of each SIM card account respectively; and the traffic displaying module is configured to display the Internet traffic of each SIM card account respectively.

A method for measuring and displaying Internet traffic of a mobile phone includes: creating a SIM card account for each SIM card respectively; when there is an Internet data stream, determining a SIM card account corresponding to the data stream, and writing Internet traffic of the data stream into the corresponding SIM card account; and displaying the Internet traffic according to the SIM card account.

Therefore, in the embodiments, the Internet traffic of each SIM card may be measured and displayed respectively, thereby meeting a requirement of a user.

DETAILED DESCRIPTION OF THE EMBODIMENTS

In view of a situation where one mobile phone has multiple SIM cards, in the embodiments, Internet traffic of each SIM card is measured respectively to meet a requirement of a user for performing traffic measurement for each SIM card, thereby better meeting the requirement of the user.

Figure 1:
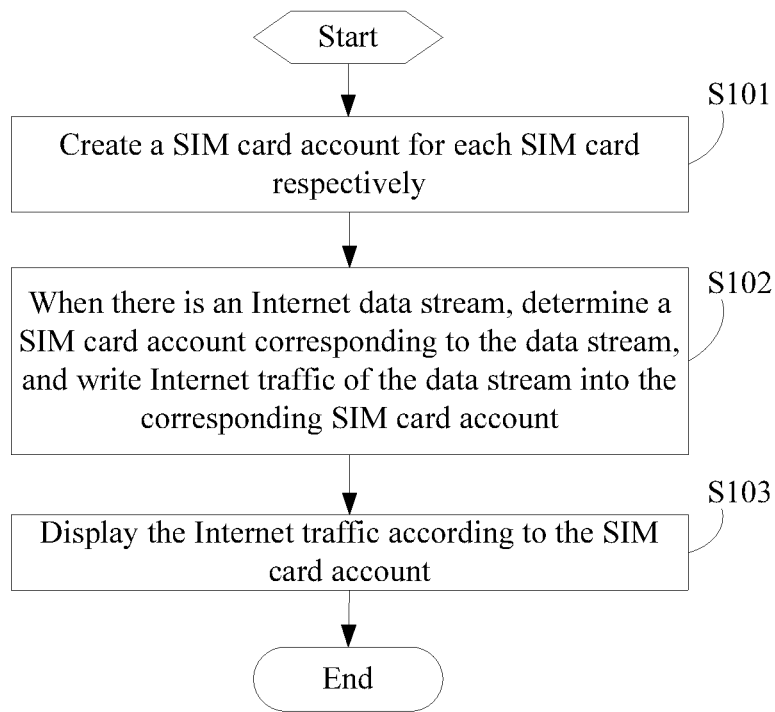
FIG. 1 is a flowchart of a method for measuring and displaying Internet traffic of a mobile phone according to an embodiment.

FIG. 1 is a flowchart of a method for measuring and displaying Internet traffic of a mobile phone according to an embodiment. The method includes the following steps: S101: Create a SIM card account for each SIM card respectively. S102: When there is an Internet data stream, determine a SIM card account corresponding to the data stream, and write Internet traffic of the data stream into the corresponding SIM card account. S103: Display the Internet traffic according to the SIM card account.

Where, S101 includes: S101a: Extract from each SIM card a unique identity of the SIM card. S101b: Create a SIM card account corresponding to the unique identity of the SIM card.

The embodiments are described in detail below from each of the stages: creating a SIM card account, measuring Internet traffic, and displaying the Internet traffic.

Figure 2:
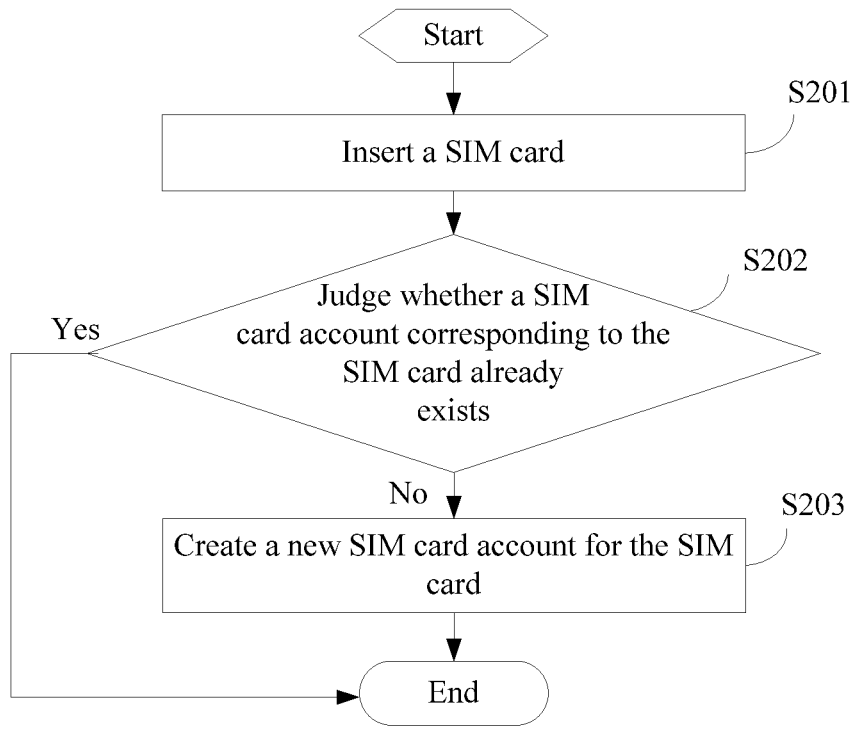
FIG. 2 is a flowchart of creating a SIM card account according to another embodiment.

FIG. 2 is a flowchart of creating a SIM card account according to another embodiment that illustrates the following operations: S201: Insert a SIM card. S202: Judge whether a SIM card account corresponding to the SIM card already exists or not. If the SIM card account corresponding to the SIM card already exists the process ends. S203: Create a new SIM card account for the SIM card. Then, the process ends.

After a mobile phone is powered on, a background program first judges whether there is an account or not according to the SIM card and an Internet data stream on the mobile phone. If there is an account, the process of creating a SIM card account is skipped. Otherwise, a new SIM card account is created in a database.

Figure 3:
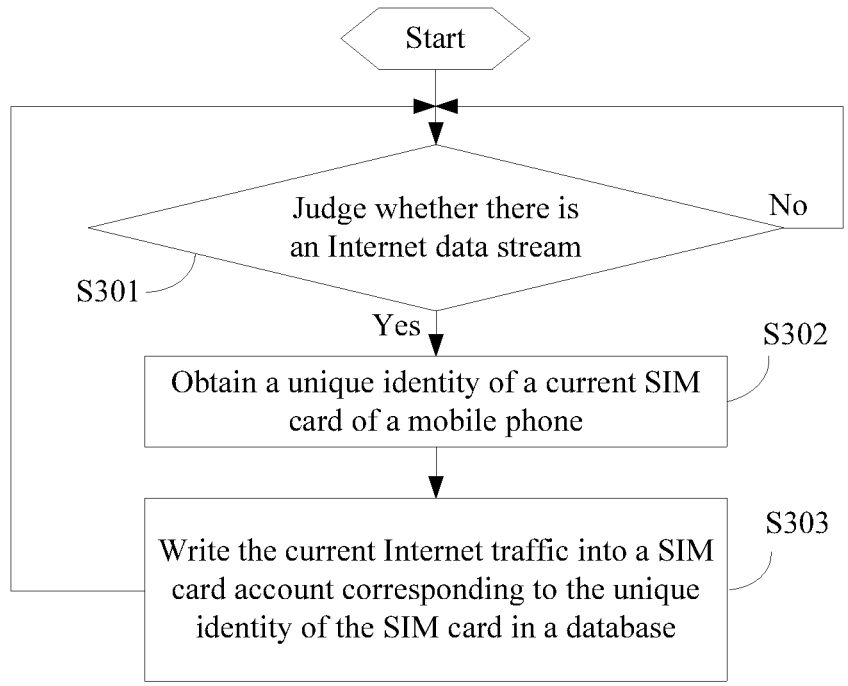
FIG. 3 is a flowchart of measuring traffic according to another embodiment.

FIG. 3 is a flowchart for measuring traffic according to another embodiment, including: S301: Judge whether there is an Internet data stream or not. If there is an Internet data stream, perform S302; or else, keep performing S301. S302: Obtain a unique identity of a current SIM card of a mobile phone (such as a SIM card number or part of the fields of the SIM card number or a coding result of the SIM card number). S303: Write current Internet traffic into a SIM card account corresponding to the unique identity of the SIM card in a database, and then continue to perform S301.

A background application keeps monitoring whether there is an Internet data stream or not. If there is no Internet data stream, the background application waits. If there is an Internet data stream, the current SIM card account is first obtained and then the Internet traffic is written into the corresponding SIM card account.

Figure 4:
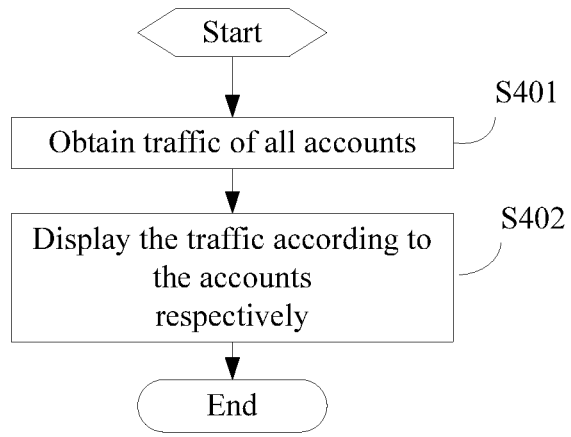
FIG. 4 is a flowchart of displaying traffic according to another embodiment.

FIG. 4 is a flowchart of displaying traffic according to another embodiment, including: S401: Obtain traffic of all accounts. S402: Display the traffic according to the accounts respectively.

An embodiment further provides an apparatus for measuring and displaying Internet traffic of a mobile phone. The apparatus may be implemented through software, hardware, or a combination of software and hardware. Specifically, the apparatus is disposed in a mobile phone for a user to query the Internet traffic of each SIM card.

Figure 5:
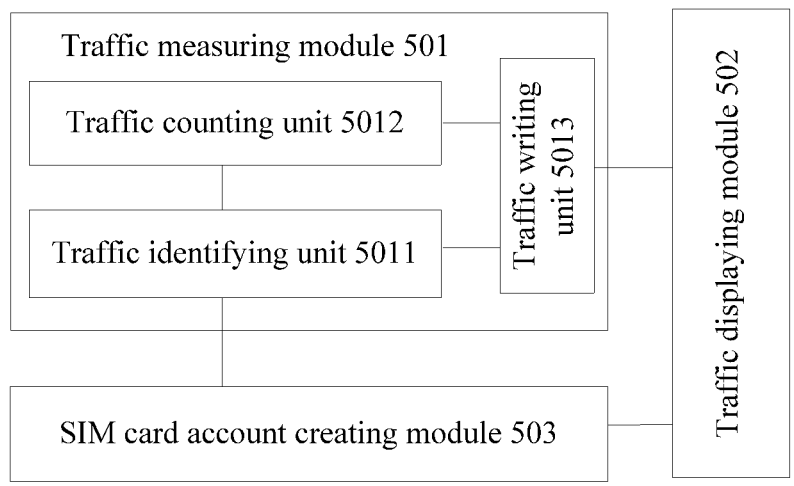
FIG. 5 is a schematic diagram of an apparatus for measuring and displaying Internet traffic of a mobile phone according to an embodiment.

FIG. 5 shows an apparatus for measuring and displaying Internet traffic of a mobile phone according to an embodiment. The apparatus includes a traffic measuring module 501, a traffic displaying module 502, and a SIM card account creating module 503, where the SIM card account creating module 503 is configured to create a SIM card account for each SIM card respectively; and the traffic measuring module 501 measures the Internet traffic of each SIM card account respectively, and the traffic displaying module 502 displays the Internet traffic of each SIM card account respectively.

The traffic measuring module 501 includes: a traffic identifying unit 5011 configured to identify a SIM card account corresponding to the current Internet traffic; a traffic counting unit 5012 configured to count the traffic; and a traffic writing unit 5013 configured to write the Internet traffic counted by the traffic counting unit 5012 into the corresponding SIM card account.

The SIM card account creating module 503 includes: an extracting submodule configured to extract from each SIM card a unique identity of the SIM card; and a creating submodule configured to create a SIM card account corresponding to the unique identity of the SIM card.

The Internet traffic displayed by the traffic-displaying module 502 is displayed in MB or by Internet-surfing time.

It should be noted that there are mature codes or hardware in an existing scheme for implementing the traffic measuring module and the traffic-displaying module. Therefore, the prior art may be applied directly in this embodiment.

In addition, an embodiment further provides a mobile phone for measuring and displaying Internet traffic according to the SIM cards, and through the mobile phone, a user may query the Internet traffic of each SIM card.

The mobile phone includes at least the following modules: a SIM card account creating module configured to create a SIM card account for each SIM card respectively; a traffic measuring module configured to measure Internet traffic of each SIM card account respectively; and a traffic displaying module configured to display the Internet traffic of each SIM card account respectively.

The traffic measuring module includes: a traffic identifying unit configured to identify a SIM card account corresponding to the current Internet traffic; a traffic counting unit configured to count the traffic; and a traffic writing unit configured to write the Internet traffic measured by the traffic counting unit into the corresponding SIM card account.

The SIM card account creating module includes: an extracting submodule configured to extract from each SIM card a unique identity of the SIM card; and a creating submodule configured to create a SIM card account corresponding to the unique identity of the SIM card.

The Internet traffic displayed by the traffic displaying module is displayed in MB or by Internet-surfing time.

Therefore, in the embodiments, the Internet traffic of each SIM card can be measured and displayed respectively, thereby meeting the requirement of the user, where at the time of displaying the traffic, duration may be displayed to the user, for example, Internet-surfing time is displayed, or the amount of used data resources is displayed to the user, for example, how many megabytes (M) of data resources have been used is displayed.

Using an actual example for description, it is assumed that a user uses two SIM cards, that is, SIM 1 and SIM 2, on a mobile phone. Monthly Internet-surfing package services subscribed by the two cards are different, that is, the service subscribed by SIM 1 is 100 minutes of free Internet-surfing time and a high charge for excess of 100 minutes, while the service subscribed by SIM 2 is 1000 MB free traffic and a high charge for excess of 1000 MB Internet traffic. According to the embodiments, the Internet traffic may be measured and displayed for SIM 1 and SIM 2 respectively so that the user can view a current Internet-surfing condition of each SIM card in an intuitive manner. For example, the user knows through a query that the Internet-surfing time that has been used by SIM 1 in a current month is 90 minutes, and that the traffic that has been used by SIM 2 in the current month is 300 MB. Therefore, the user may properly reduce the use of SIM 1 for surfing the Internet and properly increase the use of SIM 2 for surfing the Internet during the subsequent time of the current month, so as to achieve an object of saving an expense.

Those of ordinary skill in the art may understand that the processes of the methods of the foregoing embodiments may be completed by relevant hardware instructed by a program. The program may be stored in a readable storage medium. When the program is executed, the corresponding steps in the foregoing methods are performed. The storage medium may be read only memory (ROM)/random access memory (RAM), a magnetic disk, a compact disc ROM (CD-ROM), and so on.

The foregoing describes only exemplary embodiments. It should be understood that those of ordinary skill in the art might modify or improve upon the embodiments. Any such modifications and improvements shall be deemed to fall within the protection scope of the claims.

What is claimed is:

1. A method for displaying data traffic of a mobile device, the method comprising:
    creating, by the mobile device, a first account assigned to a first subscriber identity module;
    creating, by the mobile device, a second account assigned to a second subscriber identity module;
    measuring, by the mobile device, the data traffic of an ongoing data stream being received by the mobile device, wherein the data traffic comprises an amount of data resource used by the ongoing data stream;
    determining, by the mobile device, whether the ongoing data stream corresponds to the first account assigned to the first subscriber identity module or the second account assigned to the second subscriber identity module;
    storing, by the mobile device, the measured data traffic of the ongoing data stream corresponding to the first account into the first account assigned to the first subscriber identity module; and
    displaying, by the mobile device, first accumulated data traffic for the first account during a period of time based on the measured data traffic of the ongoing data stream corresponding to the first account and second accumulated data traffic for the second account during the period of time based on the measured data traffic of the ongoing data stream corresponding to the second account, respectively.

2. The method according to claim 1, further comprising receiving, by the mobile device, a query operation from a user for the displaying of the first accumulated data traffic for the first account and the second accumulated data traffic for the second account.

3. The method according to claim 1, wherein the period of time includes a current month.

4. The method according to claim 3, further comprising displaying threshold usage for data traffic of the first subscriber identity module of the current month and threshold usage for data traffic of the second subscriber identity module of the current month, respectively.

5. The method according to claim 1, wherein the data resource is Internet data.

6. The method according to claim 1, wherein creating the first account comprises extracting, by the mobile device, a unique identity of the first subscriber identity module, and wherein the first account is created to correspond to the unique identity of the first subscriber identity module.

7. The method according to claim 1, wherein creating the second account comprises extracting, by the mobile device, a unique identity of the second subscriber identity module, and wherein the second account is created to correspond to the unique identity of the second subscriber identity module.

8. The method according to claim 1, wherein the first account is created when there is no account assigned to the first subscriber identity module.

9. The method according to claim 1, wherein the second account is created when there is no account assigned to the second subscriber identity module.

10. The method according to claim 1, further comprising:
    receiving, by the mobile device, a selection operation for selecting the second subscriber identity module to receive a next data stream, wherein the selection operation is received after displaying of the first accumulated data traffic for the first account and the second accumulated data traffic for the second account;
    receiving, by the mobile device, the next data stream;
    measuring, by the mobile device, the data traffic of the next data stream being received by the mobile device; and
    storing, by the mobile device, the measured data traffic of the next data stream corresponding to the second account into the second account assigned to the second subscriber identity module.

11. A mobile device, comprising:
    a transceiver configured to receive an ongoing data stream;
    a processor coupled to the transceiver and configured to:
        create a first account assigned to a first subscriber identity module;
        create a second account assigned to a second subscriber identity module;
        measure data traffic of the ongoing data stream being received by the transceiver, wherein the data traffic comprises an amount of data resource used by the ongoing data stream;
        determine whether the ongoing data stream corresponds to the first account assigned to the first subscriber identity module or the second account assigned to the second subscriber identity module; and
        store the measured data traffic of the ongoing data stream corresponding to the first account into the first account assigned to the first subscriber identity module; and
    a display coupled to the processor and configured to display first accumulated data traffic for the first account during a period of time based on the measured data traffic of the ongoing data stream corresponding to the first account and second accumulated data traffic for the second account during the period of time based on the measured data traffic of the ongoing data stream corresponding to the second account, respectively.

12. The mobile device according to claim 11, wherein the mobile device further comprises an input device configured to receive a query operation from a user for the displaying of the first accumulated data traffic for the first account and the second accumulated data traffic for the second account before the display displays the first accumulated data traffic for the first account during the period of time and the second accumulated data traffic for the second account during the period of time, respectively.

13. The mobile device according to claim 11, wherein the period of time includes a current month.

14. The mobile device according to claim 13, wherein the display is further configured to display threshold usage for data traffic of the first subscriber identity module of the current month and threshold usage for data traffic of the second subscriber identity module of the current month, respectively.

15. The mobile device according to claim 11, wherein the data resource is Internet data.

16. The mobile device according to claim 11, wherein the processor is further configured to:
    extract a unique identity of the first subscriber identity module; and create the first account assigned to the first subscriber identity module corresponding to the unique identity of the first subscriber identity module.

17. The mobile device according to claim 11, wherein the processor is further configured to:
   extract a unique identity of the second subscriber identity module; and
   create the second account assigned to the second subscriber identity module corresponding to the unique identity of the second subscriber identity module.

18. The mobile device according to claim 11, wherein the processor is further configured to create the first account assigned to the first subscriber identity module when there is no account assigned to the first subscriber identity module.

19. The mobile device according to claim 11, wherein the processor is further configured to create the second account assigned to the second subscriber identity module when there is no account assigned to the second subscriber identity module.

20. The mobile device according to claim 11, wherein the mobile device further comprises an input device configured to receive a selection operation for selecting the second subscriber identity module to receive a next data stream, wherein the transceiver is configured to receive the next data stream using the second subscriber identity module, and wherein the processor is further configured to:
   measure the data traffic of the next data stream being received by the mobile device; and
   store the measured data traffic of the next data stream corresponding to the second account into the second account assigned to the second subscriber identity module.

21. The mobile device according to claim 11, wherein the first subscriber identity module and the second subscriber identity module are simultaneously located on the mobile device.

22. The mobile device according to claim 11, wherein the first subscriber identity module is part of a first subscribe identity module (SIM) card that corresponds to the first account, wherein the second subscriber identity module is part of a second subscribe identity module (SIM) card that corresponds to the second account, and wherein the first SIM card and the second SIM card are both connected to the mobile device when the processor determines whether the ongoing data stream corresponds to the first account assigned to the first subscriber identity module or the second account assigned to the second subscriber identity module.

* * * * *